May 28, 1935.  J. MELLING  2,002,786
BRAKE
Filed Aug. 11, 1933    2 Sheets-Sheet 1
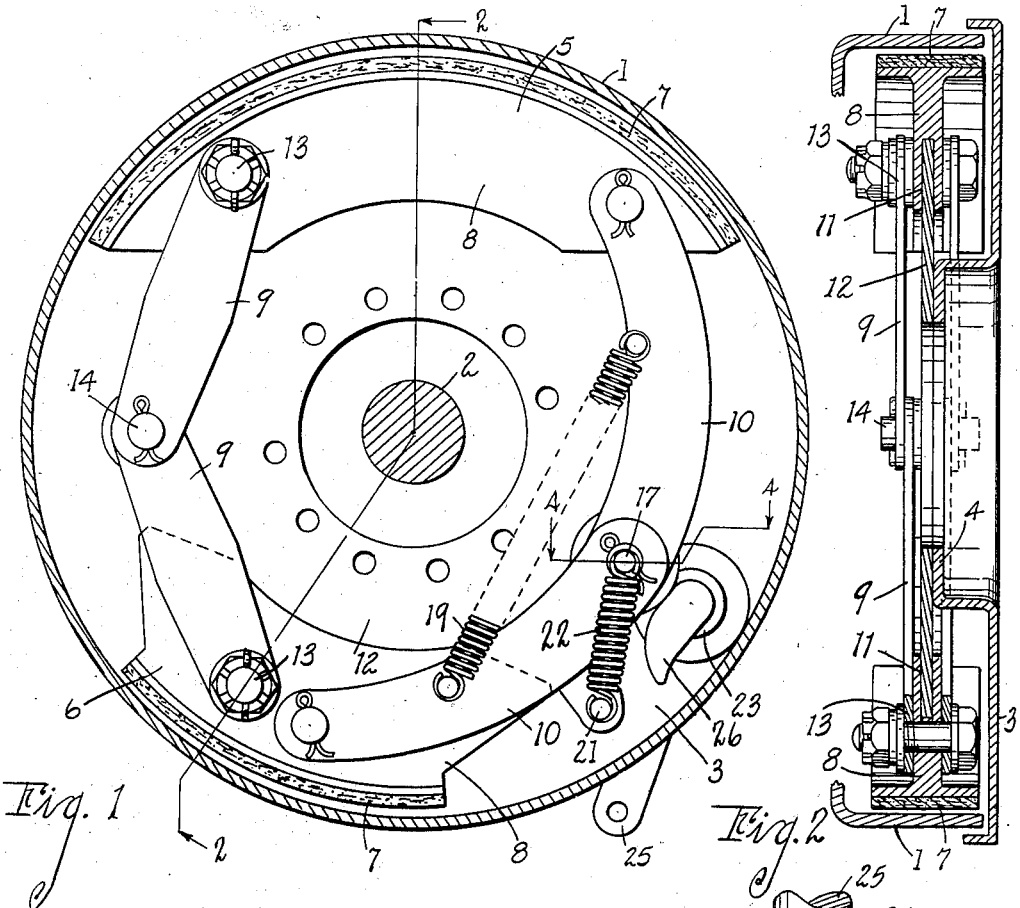
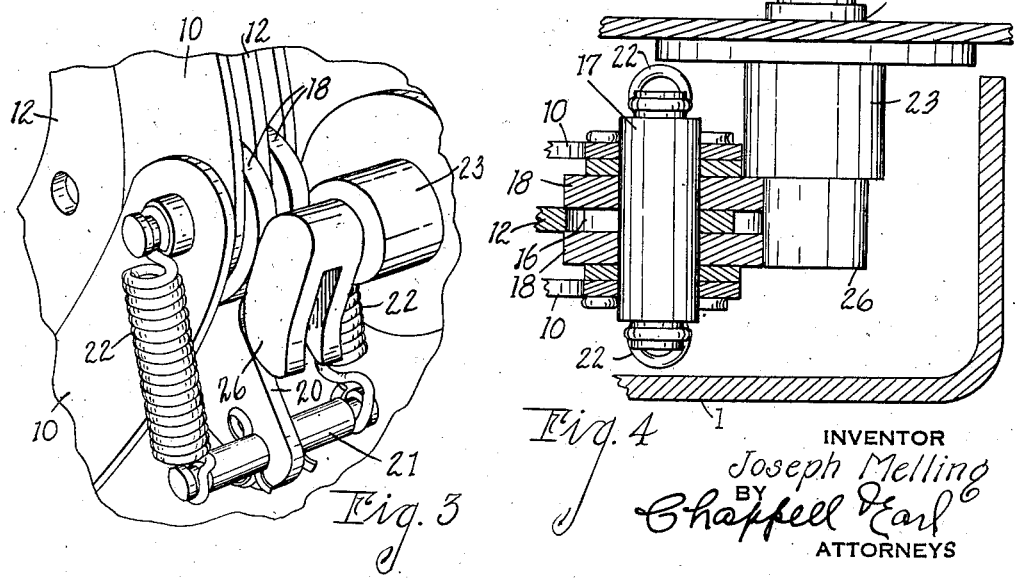
INVENTOR
Joseph Melling
BY
Chappell Earl
ATTORNEYS May 28, 1935.  J. MELLING  2,002,786
BRAKE
Filed Aug. 11, 1933  2 Sheets-Sheet 2

INVENTOR
Joseph Melling
BY
Chappell Earl
ATTORNEYS

Patented May 28, 1935

2,002,786

UNITED STATES PATENT OFFICE 2,002,786

BRAKE

Joseph Melling, Jackson, Mich., assignor of one-half to Charles T. Cline, Jackson, Mich.

Application August 11, 1933, Serial No. 684,644

11 Claims. (Cl. 188—78)

The main objects of this invention are:

First, to provide an improved brake which is self-centering, requires no internal adjustments of any kind, is self-energizing in either direction, and is provided with a full-floating expanding mechanism.

Second, to provide a clutch or brake or like mechanism which is very powerful and at the same time easy to operate.

Third, to provide a mechanism of this character which is compact and light in weight, strong and durable, simple and economical in its parts, and very efficient in operation.

Objects relating to details and economies of my invention will appear from the description to follow. The invention is defined and pointed out in the claims.

A structure which is a preferred embodiment of my invention is illustrated in the accompanying drawings, in which:

Fig. 1 is a fragmentary view partially in section and partially in side elevation looking from the left of Fig. 2, of a brake or clutch mechanism embodying the features of my invention.

Fig. 2 is a fragmentary section on a line corresponding to line 2—2 of Fig. 1.

Fig. 3 is an enlarged fragmentary perspective view of the expanding mechanism.

Fig. 4 is an enlarged fragmentary detail of the expanding mechanism partially in section on line 4—4 of Fig. 1.

Figure 5:
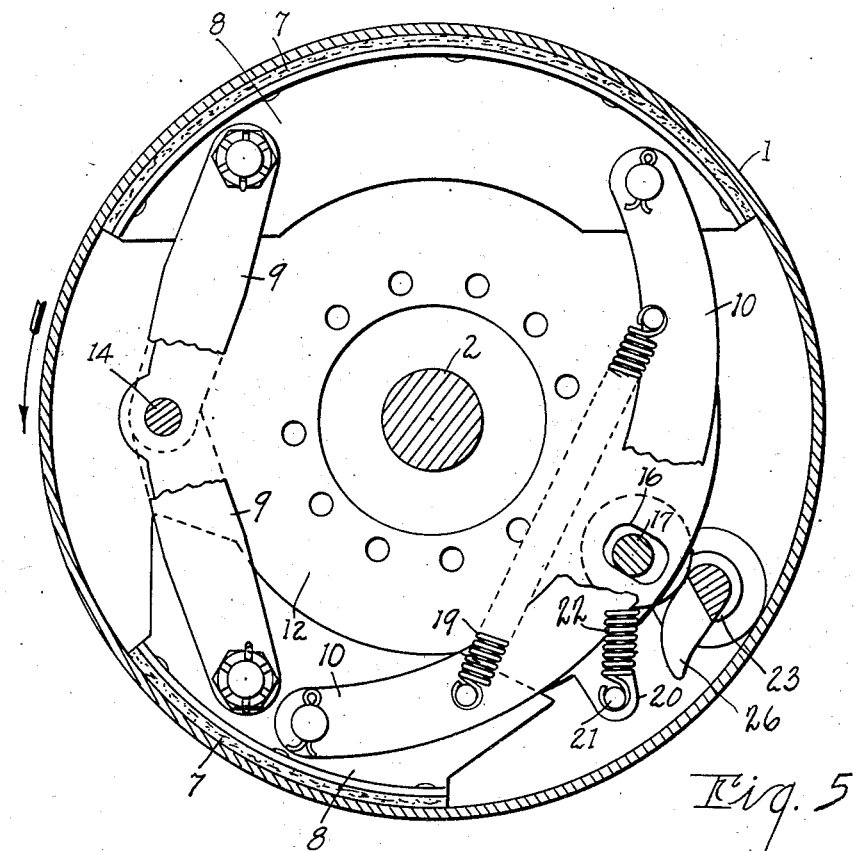
Fig. 5 is a view similar to Fig. 1, mainly in side elevation with part of the structure broken away and parts in section.

In the embodiment of my invention illustrated by the drawings, I represents a brake drum and 2 an axle of a motor vehicle. It should be understood, however, that my improvements are readily adapted or embodied for use in various relations as in clutches or brakes other than those for motor vehicles. The annular plate-like support 3 is suitably mounted, as on an axle housing (not shown) and is provided with an internal offset annular flange 4.

I provide a pair of forward and reverse segmental brake shoes or clutch members 5 and 6, respectively, the facings therefor being illustrated at 7. These shoes have centrally disposed webs 8 to facilitate attachment of the links 9 and toggle levers 10 thereto. The centrally disposed webs are provided in their inner edges with internal segmental grooves or channels 11 receiving the periphery of the annular guide plate 12 which is secured to the internal flange 4 of the support member 3. The relation between the grooves and the plate is such that the latter constitutes a guide and support for the shoes in their radial and circumferential movement.

The links 9 are pivotally connected to the shoe webs at 13 and at their inner ends to the cross pin 14 which extends through the cross pin hole 15 in the guide plate 12.

Opposite the pin, the plate 12 is provided with a slot 16 through which extends the shaft or journal pin 17 for limited radial and circumferential movement relative to the plate 12. The shaft is provided with rollers 18 which are disposed adjacent opposite faces of the plate, the toggle levers 10 being disposed at the outer sides of the rollers, see Fig. 4.

Springs 19 connect the toggle levers and act to retract or draw the shoes away from the drum, as illustrated by Fig. 1. The plate 12 is provided with an outwardly extending radial ear 20 through which is arranged the cross arm 21, the ends of the cross arm being connected to the ends of the journal pin by the springs 22 which act to position the journal pin in the slot to center the mechanism.

The cam shaft 23 is journaled to the support member at 24 and is provided with a crank 25 at its outer end and a forked cam 26 at its inner end for coaction with the rollers to expand the shoes into engagement with the drum.

As indicated by Fig. 5, the direction of rotation of the drum is normally from the cam shaft toward the forward shoe this direction being indicated on the drawing by the arrow. When the cam is actuated to expand the shoes, they engage the drum as illustrated by Fig. 5, the arrangement of parts being such that the reverse shoe contacts with the drum first, thereby raising the toggle shaft from the bottom edge of the slot in the supporting plate 12, causing the forward shoe to be forced into action. The bottom edge of the slot centers the brake when the brake is released, thereby giving equal clearance to both shoes, as illustrated by Fig. 1. The reverse shoe engages the drum first by virtue of the action of the spring 22 which holds the primary shoe out of engagement with the drum until the reverse shoe is applied. The reverse shoe is adapted to engage the drum first to cause the pin 17 in the slot 16 to raise from the bottom of the slot, as illustrated, and allow the mechanism to float. The floating condition of the mechanism thus permits the energizing forces of one shoe to be transmitted to the opposite shoe.

I secure a very powerful brake or clutch mechanism wherein substantially the full braking surface of the shoe is utilized, the shoes being supported so that pressure is uniformly applied throughout the length thereof. This results in a maximum gripping action and a minimum of wear to the parts. The expanding mechanism is full-floating and the parts are self-centering in contraction and expansion. The mechanism requires no internal adjustments whatsoever.

Figure 6:
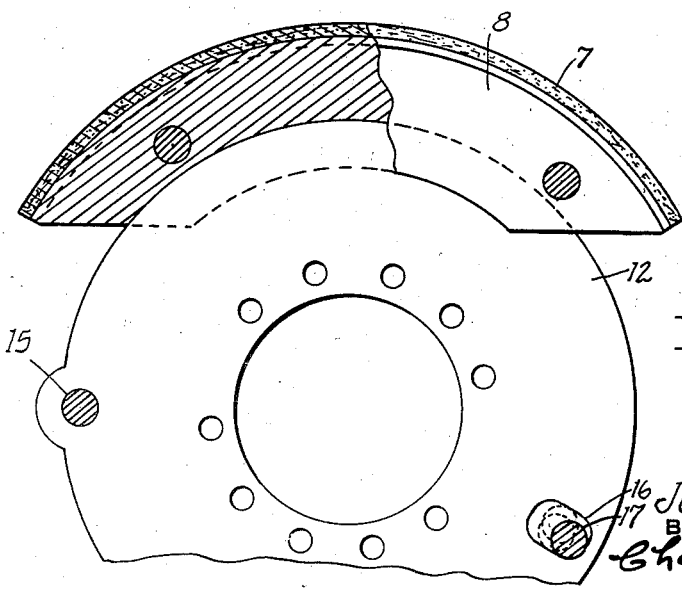
Fig. 6 is a fragmentary view in side elevation, portions of the structure being omitted and parts shown in section.

In addition to the above, I provide a brake or clutch mechanism which is self-energizing in either direction. As pointed out above, when the drum rotates in the forward direction, the lower small or reverse shoe engages the drum first, thereby raising the toggle journal pin 17 from the lower edge of the slot 16 and forcing the forward shoe into clutching or braking engagement with the drum. The action of the toggle journal pin is illustrated by Fig. 6. In the full line position of the pin illustrated, the brakes are released. In the lower dotted line position, the reverse shoe contacts with the drum. In the upper dotted line position, the forward brake is applied.

When the drum is rotating in the reverse direction, the reverse shoe engages the drum first, as explained above, but in this case the mechanism is caused to float, not by the action of the reverse drum, but by the action of the cam 26 on the rollers 18 in elevating the pin 17 within the slot 16. Thus, the ultimate engagement of the forward shoe with the drum results in the transmission of braking force to the reverse shoe.

A further advantage is that the forked cam is positioned, not between the toggle levers as in prior structures, but to one side thereof so that the cam is relieved of self-energizing forces tending to release the brake. Thus, in manually operated brakes, the brakes may be operated with a small amount of effort compared to prior devices. Notwithstanding this small amount of effort required to operate the brake, the braking action is a powerful one inasmuch as the power applied to the control crank is very substantially increased by the mechanism. Furthermore, the parts are simple and few in number and are supported in such manner that the strain thereon is minimized.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. In a brake the combination of a drum, a support member, a supporting and guiding plate mounted centrally on said support member and having a transverse pin at one side and a radially disposed slot at the other side, oppositely disposed forward and reverse shoes having centrally disposed webs of channel cross section receiving opposite edges of said plate whereby the plate constitutes a guide for the radial and circumferential movement of the shoes, pairs of links pivotally connecting said pin to said shoes, a journal pin disposed in the said slot for limited radial and circumferential movement relative to the drum, rollers disposed on said journal pin on opposite sides of said plate, pairs of toggle levers pivoted to said shoes and journal pin at the outer sides of said rollers, springs connecting said toggle levers and acting to retract the shoes, springs connecting the ends of said journal pin to said supporting plate and acting to position said journal pin in said slot to center the shoes in retracted position, and a cam shaft journaled in said support member and having a forked cam coacting with said rollers to expand said shoes, the forward direction of rotation of the drum being from the journal pin toward the forward shoe whereby the drum tends to expand the forward shoe and contract the reverse shoe when the cam is actuated to expand the shoes into engagement therewith on the forward rotation of the drum and on the reverse rotation tends to retract the forward shoe and expand the reverse shoe.

2. In a brake, the combination of a drum, a support member, a supporting and guiding plate mounted centrally on said support member and having a transverse pin at one side and a radially disposed slot at the other side, oppositely disposed forward and reverse shoes having centrally disposed webs of channel cross section receiving opposite edges of said plate whereby the plate constitutes a guide for the radial and circumferential movement of the shoes, links pivotally connecting said pin to said shoes, a journal pin disposed in the said slot for limited radial and circumferential movement relative to the drum, a roller disposed on said journal pin, toggle levers pivoted to said shoes and journal pin, a spring acting to retract the shoes, a spring acting to position said journal pin in said slot to center the shoes in retracted position, and a cam shaft journaled in said support member and having a cam coacting with said roller to expand said shoes, the forward direction of rotation of the drum being from the journal pin toward the forward shoe whereby the drum tends to expand the forward shoe and contract the reverse shoe when the cam is actuated to expand the shoes into engagement therewith on the forward rotation of the drum and on the reverse rotation tends to retract the forward shoe and expand the reverse shoe.

3. In a brake, the combination of a drum, a support member, a supporting and guiding plate on said support member having a radial slot, oppositely disposed forward and reverse shoes having webs of channel cross section receiving opposite edges of said plate whereby the plate constitutes a guide for the radial and circumferential movement of the shoes, pairs of links pivotally connecting said shoes to said plate, a journal pin mounted on said plate for limited radial and circumferential movement relative to the drum, toggle levers pivoted to said shoes and journal pin, springs connecting said toggle levers and acting to retract the shoes, springs connecting the ends of said journal pin to said supporting plate and acting to position said journal pin in said slot to center the shoes in retracted position, and a cam shaft journaled in said support member and having a cam coacting with said toggle levers to expand said shoes.

4. In a brake, the combination of a drum, a support member, a supporting and guiding plate on said support member having a radial slot, oppositely disposed forward and reverse shoes having webs of channel cross section receiving opposite edges of said plate whereby the plate constitutes a guide for the radial and circumferential movement of the shoes, links pivotally connecting said shoes to said plate, a journal pin mounted on said plate for limited radial and circumferential movement relative to the drum, toggle levers pivoted to said shoes and journal pin, a spring acting to retract the shoes, a spring acting to position said journal pin in said slot to center the shoes in retracted position, and a cam shaft journaled in said support member and having a cam coacting with said toggle levers to expand said shoes.

5. In a brake, the combination of a drum, a support having a slot, oppositely disposed forward and reverse shoes mounted on said support for radial and circumferential movement of the shoes, links pivotally connecting said shoes to said support, a journal pin mounted on said support for limited radial and circumferential movement relative to the drum, toggle levers pivoted to said shoes and journal pin, springs connecting said toggle levers and acting to retract the shoes, springs connecting the ends of said journal pin to said support and acting to position said journal pin in said slot to center the shoes in retracted position, and means for actuating said toggle levers.

6. In a brake, the combination of a drum, a support having a slot, oppositely disposed forward and reverse shoes mounted on said support for radial and circumferential movement of the shoes, links pivotally connecting said shoes to said support, a journal pin mounted on said support for limited radial and circumferential movement relative to the drum, toggle levers pivoted to said shoes and journal pin, a spring acting to retract the shoes, a spring acting to position said journal pin in said slot to center the shoes in retracted position, and means for actuating said toggle levers.

7. In a brake, the combination of a drum, a support member, a supporting and guiding plate on said support member, oppositely disposed forward and reverse shoes having centrally disposed webs of channel cross section receiving opposite edges of said plate whereby the plate constitutes a guide for the radial and circumferential movement of the shoes, tangentially arranged links pivotally connecting said shoes to said plate, tangentially arranged toggle levers pivoted to said shoes, a spring acting to retract the shoes, and a cam shaft journaled in said support member and having a cam coacting with said levers to expand said shoes.

8. In a brake, the combination with a drum, of a relatively fixed support, oppositely disposed forward and reverse shoes having sliding supporting engagement with said support permitting radial and circumferential movement of the shoes, links carried by said support disposed in opposed relation and pivotally connected to said shoes, toggle levers disposed in opposed relation and pivotally connected to said shoes, a connecting pin for said toggle levers having limited lost motion connection with said support, a spring normally acting to collapse said toggle, a spring acting to position said toggle pin to normally center the shoes in retracted position, and a toggle actuating cam mounted on said support, the shoes being associated with the drum so that the forward rotation of the drum upon the initial engagement of the forward shoe therewith tends to expand the forward shoe and contract the reverse shoe and the reverse rotation of the drum upon the initial engagement of the reverse shoe therewith tends to retract the forward shoe and expand the reverse shoe.

9. In a brake, the combination with a drum, of a relatively fixed support, oppositely disposed forward and reverse shoes having sliding supporting engagement with said support permitting radial and circumferential movement of the shoes, links carried by said support disposed in opposed relation and pivotally connected to said shoes, toggle levers disposed in opposed relation and pivotally connected to said shoes, a connecting pin for said toggle levers having limited lost motion connection with said support, a spring normally acting to position said toggle pin to normally center the shoes in retracted position, and manually controlled means for actuating said toggle levers.

10. In a brake, the combination of a drum, a support, forward and reverse shoes disposed above and below said support, a pair of tangentially arranged links pivoted to one side of said support and shoes, a pair of tangentially arranged levers pivoted to the other side of said shoes and to said support for limited radial and circumferential movement, a spring urging said shoes inwardly at said other side thereof to hold them retracted, a spring urging said levers toward their lower and outer radial limit and acting to hold the forward shoe out of engagement with the drum until the reverse shoe is applied, and cam means acting in opposition to said last named spring for expanding said shoes.

11. In a brake, the combination of a drum, a support, forward and reverse shoes disposed above and below said support, a pair of tangentially arranged links pivoted to one side of said support and shoes, a pair of tangentially arranged levers pivoted to the other side of said shoes and to said support for limited radial and circumferential movement, a spring urging said shoes inwardly at said other side thereof to hold them retracted and acting to hold the forward shoe out of engagement with the drum until the reverse shoe is applied, and means acting in opposition to said spring for expanding said shoes.

JOSEPH MELLING.